United States Patent [19]

Spaulding

[11] Patent Number: 4,547,692
[45] Date of Patent: Oct. 15, 1985

[54] POSITIONAL CONTROL SYSTEM EMPLOYING INDUCTION MOTOR AND ELECTRONIC BRAKING THEREOF

[76] Inventor: Carl P. Spaulding, 275 N. Halstead, Pasadena, Calif. 91107

[21] Appl. No.: 540,199
[22] Filed: Oct. 7, 1983
[51] Int. Cl.[4] ............................................. G05B 19/00
[52] U.S. Cl. .................................. 318/592; 318/760; 318/567; 318/594
[58] Field of Search ............... 318/757, 758, 760, 613, 318/592, 594, 595, 561, 567

[56] References Cited

U.S. PATENT DOCUMENTS

| | | | |
|---|---|---|---|
| 4,241,302 | 12/1980 | Benjamin | 318/758 |
| 4,242,621 | 12/1980 | Spaulding | 318/601 |
| 4,246,523 | 1/1981 | Nagai | 318/626 |
| 4,305,030 | 12/1981 | Lorenz | 318/759 |
| 4,395,670 | 7/1983 | Podel | 318/758 |

Primary Examiner—Bernard Roskoski
Attorney, Agent, or Firm—Christie, Parker & Hale

[57] ABSTRACT

An induction motor is coupled to a movable load to be positioned. The induction motor has two or more stator windings. Alternating current power is connected to the stator windings to energize the motor. A transducer senses the position of the load. Responsive to the transducer, the alternating current power is disconnected from the stator windings as the motor approaches a predetermined load position. Also responsive to the transducer, a direct current energy storage device is connected to the motor as the motor approaches more closely to the predetermined load position to apply direct current to the stator windings and to stop the motor at the predetermined load position. Preferably, the storage device comprises a capacitor connected in series with a rectifier across two input terminals of the motor and the storage device is connected to the motor by a relay coupled from the junction of the rectifier and capacitor to one of the input terminals of the motor.

17 Claims, 4 Drawing Figures

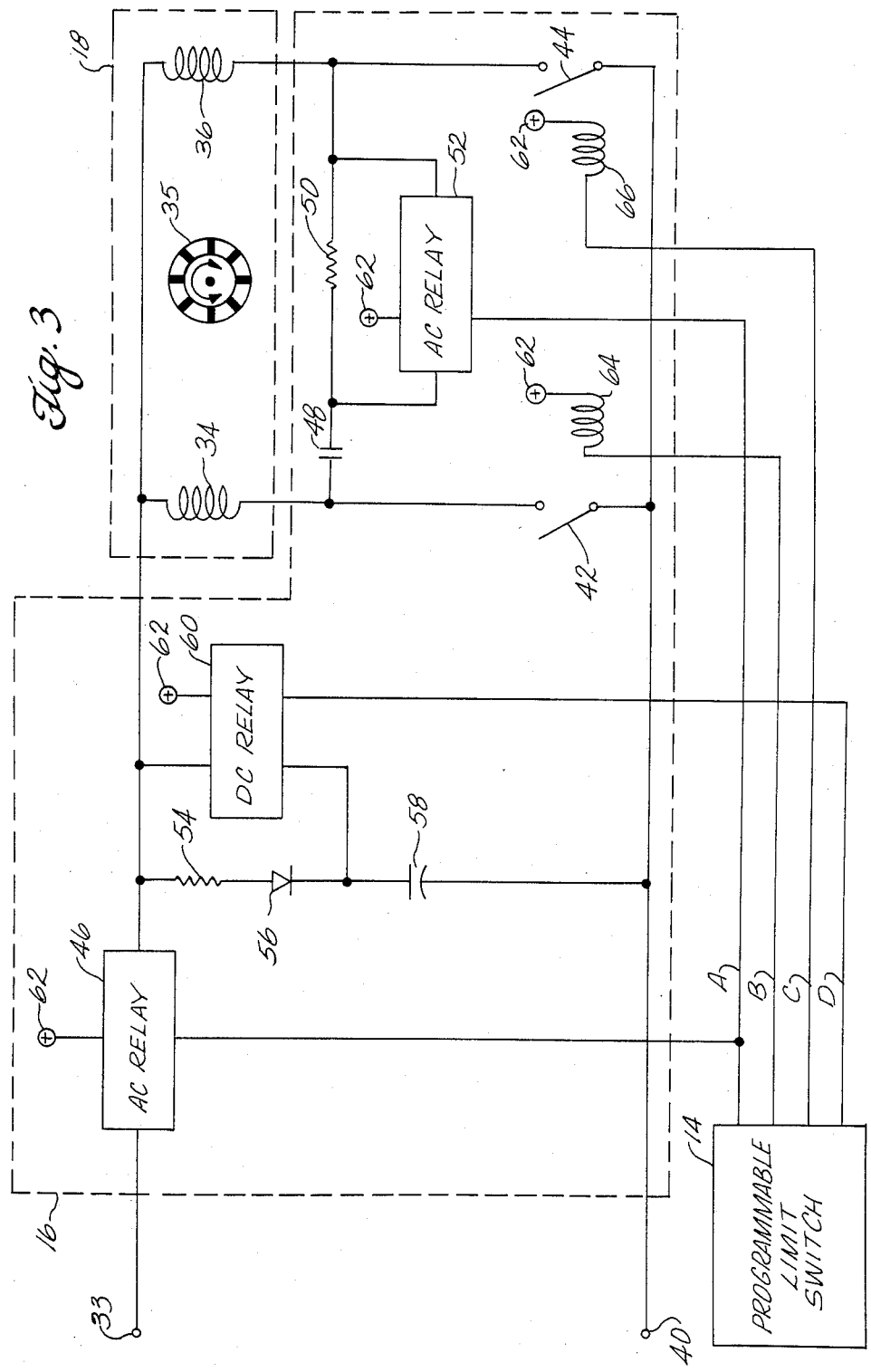

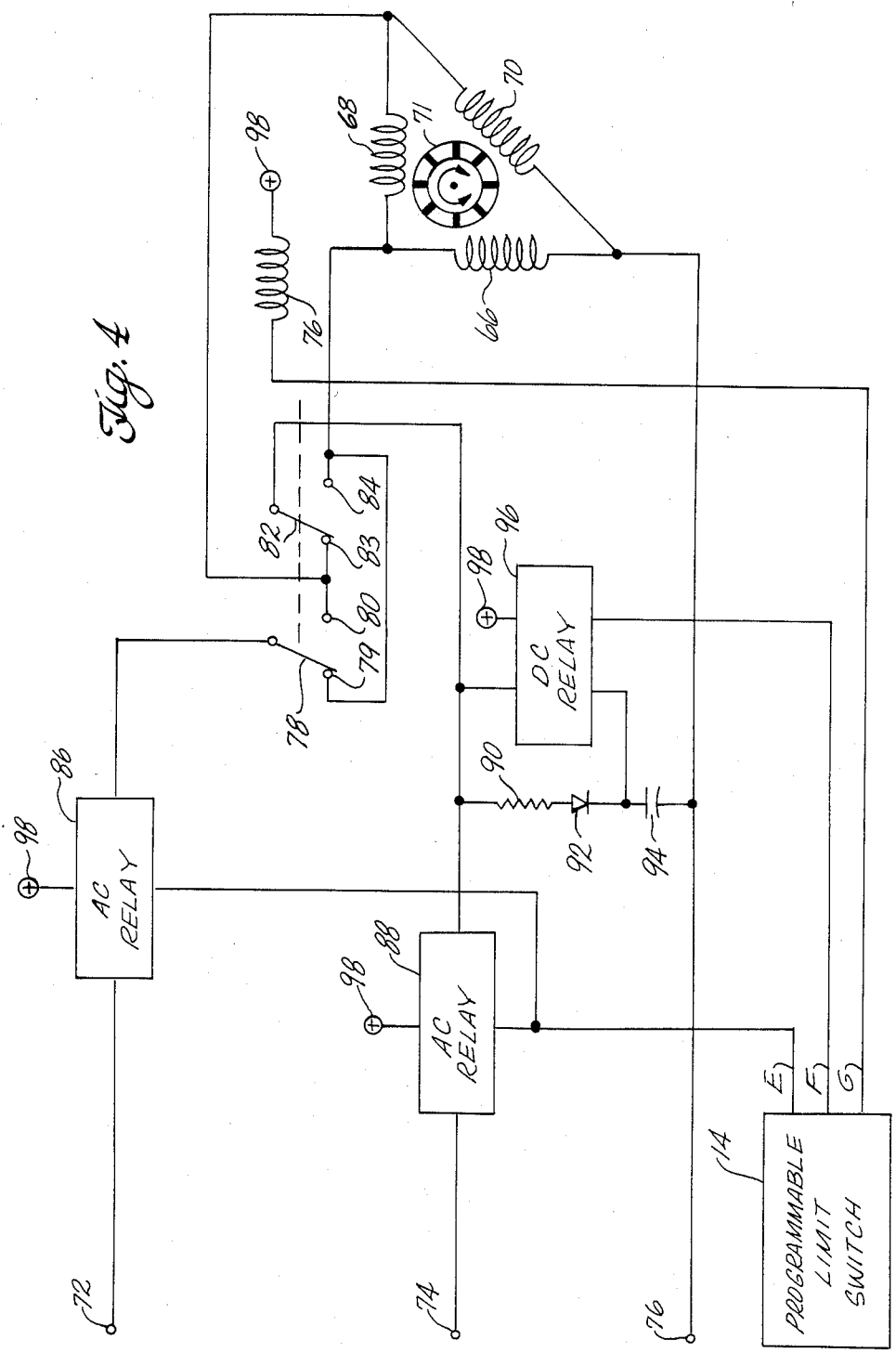

4,547,692

POSITIONAL CONTROL SYSTEM EMPLOYING INDUCTION MOTOR AND ELECTRONIC BRAKING THEREOF

BACKGROUND OF THE INVENTION

This invention relates to position control and, more particularly, to a system for controlling the position of a movable member and a motor drive therefor.

One commonly used technique to control the position of a movable member, i.e., a load, utilizes a direct current motor incorporated in a feedback loop to drive the load. A transducer senses the actual position of the load. The output of the transducer is applied to a summing junction with a command signal representative of the desired position of the load. The difference signal generated by the summing junction feeds the motor such that the motor drives the load to the desired position.

Another commonly used technique to control the position of a load is to use a stepper motor to drive the load. Depending upon the desired degree of reliability, the stepper motor is incorporated into a feedback loop or operated open loop.

By comparison to direct current motors and stepper motors, an induction motor is economical, efficient, and rugged. Known techniques for controlling the position of an induction motor, however, have not been as precise as direct current and stepper motors. These techniques employ a mechanical limit switch together with a friction brake to stop an induction motor at a predetermined load position with an accuracy in the order of ±0.250 of an inch to ±0.100 of an inch. At the cost of additional complexity, the accuracy can be improved by slowing the motor down in stages prior to the mechanical braking.

Although it is known to brake an induction motor electronically by injecting direct current into its stator windings, such electronic braking, has in the past been initiated responsive to the disconnection of power from the motor rather than in response to load position. As a result, control over the position at which the load stops has not been exercised by prior electronic techniques for braking induction motors.

My U.S. Pat. No. 4,242,621, issued Dec. 30, 1980, discloses a programmable limit switch that permits one or more operations to be controlled responsive to the position of a movable member, specifically a machine tool slide. A transducer senses the actual position of the machine tool slide. Binary signals representative of sets of positional upper and lower limits corresponding to each of the operations are stored in an addressable memory. Each of the limits in the memory is sequentially compared with the actual position of the machine tool slide and an output switch is energized while the machine tool slide is between the limits set for an operation, thereby executing such operation. The limits within which an operation is performed can be programmed simply by changing the signals representing such limits in the addressable memory.

SUMMARY OF THE INVENTION

According to the invention, an induction motor is coupled to a movable load to be positioned. The induction motor has two or more stator windings. Alternating current power is connected to the stator windings to energize the motor. A transducer senses the position of the load. Responsive to the transducer, the alternating current power is disconnected from the stator windings as the motor approaches a predetermined load position. Also responsive to the transducer, a direct current energy storage device is connected to the motor as the motor approaches more closely to the predetermined load position to apply direct current to the stator windings and to stop the motor at the predetermined load position. Preferably, the storage device comprises a capacitor connected in series with a rectifier across two input terminals of the motor and the storage device is connected to the motor by a relay coupled from the junction of the rectifier and capacitor to one of the input terminals of the motor. A load coupled to an induction motor and moving at a speed of 60 inches per minute can be stopped with an accuracy in the order of ±0.002 of an inch by practice of the invention.

A feature of the invention is the use of a programmable limit switch of the type disclosed in the above-referenced U.S. patent to control operation of the motor and initiation of the decelerating measures.

BRIEF DESCRIPTION OF THE DRAWINGS

The features of a specific embodiment of the best mode contemplated of carrying out the invention are illustrated in the drawings, in which:

FIG. 3 is a schematic diagram of one embodiment of the control circuit and induction motor of FIG. 1; and FIG. 4 is a schematic diagram of another embodiment of the control circuit and induction motor of FIG. 1.

DETAILED DESCRIPTION OF THE SPECIFIC EMBODIMENTS

Figure 1:
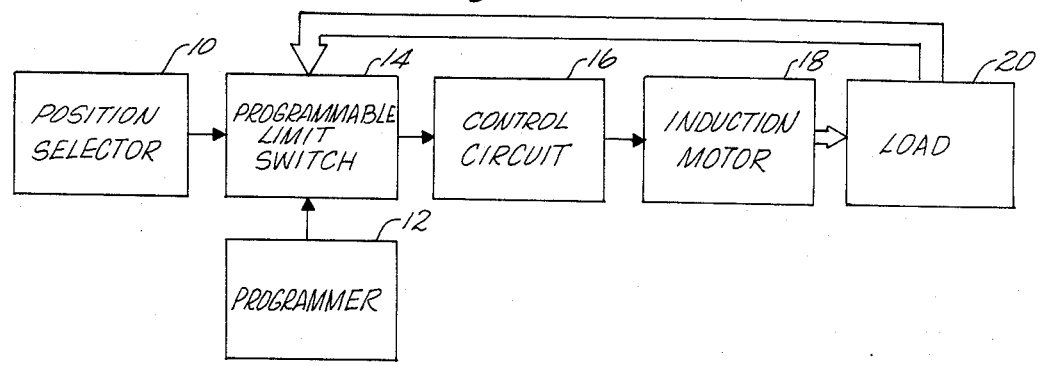
FIG. 1 is a schematic block diagram of a position control system incorporating the principles of the invention.

In FIG. 1, a position selector 10 and a programmer 12 are electrically connected to a programmable limit switch 14. Limit switch 14 is electrically connected to a control circuit 16. Responsive to limit switch 14, control circuit 16 operates an induction motor 18 to which it is electrically coupled. Induction motor 18 is mechanically coupled to a load to be positioned, such as for example, a machine tool slide. Load 20 is also mechanically coupled to an electrical encoder in programmable limit switch 14, which functions as a transducer to sense the actual position of load 20. Position selector 10 feeds to limit switch 14 a command signal representative of a predetermined load position to which load 20 is to be driven by motor 18.

Limit switch 14 has a plurality of addressable memories, one corresponding to each predetermined load position to which it is desired to position load 20. In each such addressable memory are stored binary information representative of positional limits to be followed by the control operations of induction motor 18 so as to transport load 20 to the corresponding predetermined load position. Exemplary motor control operations are connecting and disconnecting alternating current to and from the stator windings of the motor, braking the rotor of the motor, and setting the direction of rotor rotation. When the actual position of load 20 moves within the limits associated with a particular operation involved in positioning load 20, an output switch in limit switch 14 closes, thereby causing control circuit 16 to change the operation of induction motor 18 and maintain such changed operation while the actual load position remains within such limits. A change in binary signals representative of new positional limits is introduced into limit switch 14 by programmer 12, which could be an input keyboard device adapted to interface with the addressable memories in limit switch 4. Position selector 10 could be a bank of manually operated switches, in which case, an operator would feed load position selecting signals to limit switch 14 one at a time by operating the manual switches as the need to reposition load 20 arises. Alternatively, position selector 10 could be a programmable controller, which automatically feeds load position selecting signals to limit switch 14 in the required sequence and time intervals.

Figure 2:
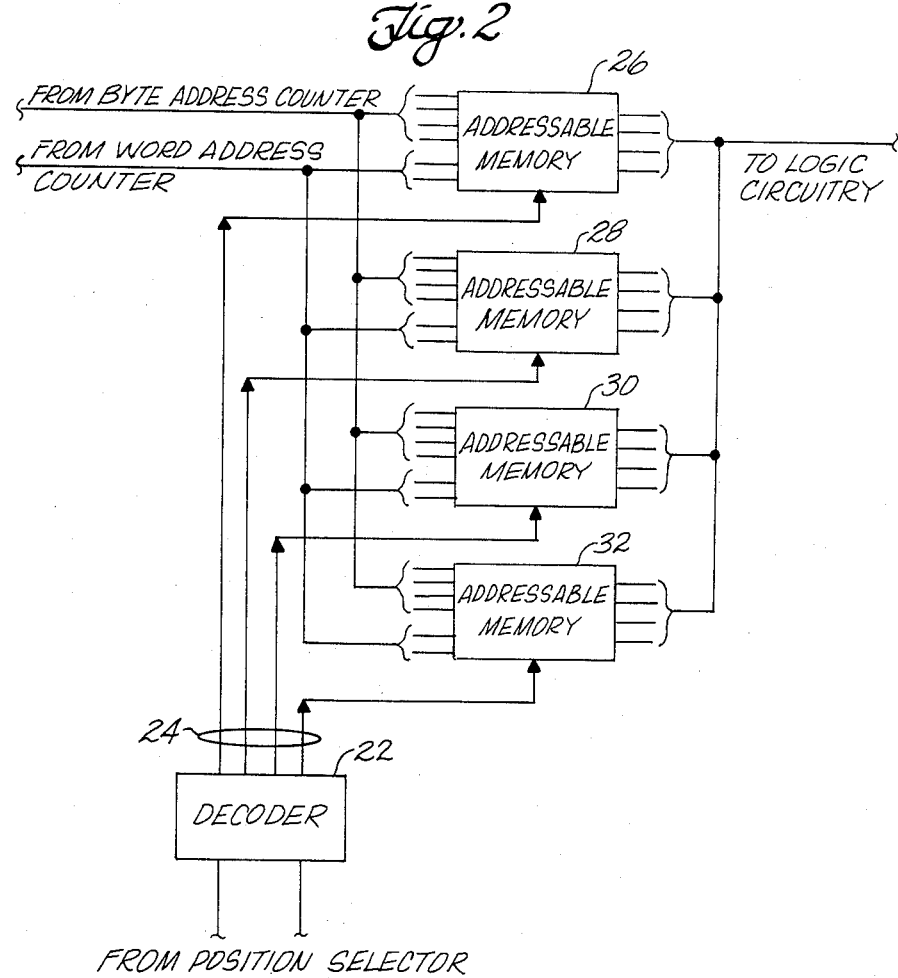
FIG. 2 is a schematic block diagram of part of the programmable limit switch of FIG. 1.

The disclosure of U.S. Pat. No. 4,242,621 is incorporated fully herein by reference. It is assumed that limit switch 14 is implemented in the manner described in the referenced patent except for the addressable memory, which is implemented in the manner depicted in FIG. 2. (Load 20 is represented in the referenced patent as a machine tool slide.)

A separate addressable memory is provided for each predetermined load position to which load 20 is to be driven. A decoder 22 selects one of the addressable memories responsive to binary input signals from position selector 10. A plurality of binary leads from a byte address counter and a plurality of leads from a word address counter, which are the same as that disclosed in the referenced patent, are connected to the inputs of each addressable memory. A plurality of binary output leads are connected from the output of each addressable memory to logic circuitry, which is the same as that described in the referenced patent. One and only one of output leads 24 is energized, i.e., high, at any one time, thereby activating the addressable memory to which the energized output lead is connected. In practice, the addressable memories could be activated by internal AND gates not shown, to which input signals from the byte address counter and the word address counter are applied as addresses and through which the output signals from the addressable memories are coupled to the logic circuitry; in such case, the energized one of output leads 24 serves as a gating input to the AND gates of the selected addressable memory. If there are $2^n$ predetermined load positions, there are n binary input leads connected from position selector 10 to decoder 22 and $2^n$ binary output leads 24 connected from the output of decoder 22 to the respective $2^n$ addressable memories. Assuming that there are four predetermined load positions, four addressable memories 26, 28, 30, and 32 are provided and decoder 22 has two input leads and four output leads. Assuming that there are four motor control operations to be performed as discussed below in connection with the embodiment of FIG. 3, there are four words stored in each addressable memory, two input leads from the word address counter connected thereto, and four output switches in the programmable limit switch. Each word is a fixed length of sixteen bytes and each byte has four bits. Thus, there are four input leads to each addressable memory from the byte address counter and four output leads from each addressable memory to the logic circuitry. The binary information stored in the selected addressable memory is transmitted to the logic circuitry one byte at a time, as described in more detail in the referenced patent, and the information in the sixteen bytes of each word is as set forth in the table in the referenced patent. The output switches in the referenced patent are connected to control circuit 16.

In practice, a single addressable memory could be, and most likely would be, internally divided by address allocation to carry out the functions of addressable memories 26, 28, 30, and 32. Furthermore, since the control operations carried out by programmable limit switch 14 can be regarded simply as machine tool operations as that term is employed in the referenced patent, a single programmable limit switch can be employed to carry out both the machine tool operations described in the referenced patent and the motor control operations described herein. In terms of the disclosure of the referenced patent, it is only necessary to assign a portion of the addressable memory to the words representative of each predetermined load position as described in the preceding paragraph, and then to assign some of the output switches to the operation of motor 18.

FIG. 3 discloses one embodiment of control circuit 16 and induction motor 18 in detail. Induction motor 18, which has stator windings 34 and 36 and a rotor 35 connected to load 20, is a single phase, split capacitor motor. A source of single phase alternating current electrical power, e.g., 115 volts, 60 cycle, has output terminals 38 and 40. Stator winding 34 is connected in series with a direction determining contact pair 42 and stator winding 36 is connected in series with a direction determining contact pair 44. An AC solid state relay 46 is connected in series with stator winding 34 and contact pair 42 across output terminals 38 and 40. Solid state relay 46 is also connected in series with stator winding 36 and contact pair 44 across output terminals 38 and 40. A phase shifting capacitor 48 and a damping resistor 50 are connected in series between the junction of stator winding 34 and contact pair 42 and the junction of stator winding 36 and contact pair 44. An AC solid state relay 52 is connected in parallel with damping resistor 50. A resistor 54, a diode 56, and a braking capacitor 58 in series are connected in parallel with stator 34 and contact pair 42 and in parallel with stator 36 and contact pair 44. A DC solid state relay 60 is connected in parallel with the series combination of resistor 54 and diode 56. As mentioned above, this embodiment controls four motor operations. Thus, four output switches of programmable limit switch 14 are connected to control circuit 16. A line A is connected from programmable limit switch 14 to relays 46 and 52. When the output switch to which line A is connected closes, line A is grounded, direct current from a source of positive bias voltage 62 flows through relay 46, thereby closing relay 46, and direct current from source of bias voltage 62 flows through relay 52, thereby closing relay 52. A line B is connected from another output switch through a relay winding for controlling contact pair 42 to source 62. When the output switch to which line B is connected closes, line B is grounded, control winding 64 is energized, and contact pair 42 closes. A line C is connected from another output switch through a relay winding for controlling contact pair 44 to source 62. When the output switch to which line C is connected closes, line C is grounded, control winding 66 is energized, and contact pair 44 closes. A line D is connected from another output switch through relay 60 to bias source 62. When the output switch to which line D is connected closes, line D is grounded, current flows from relay 60, thereby closing relay 60.

When the motor is at one predetermined load position and position selector 10 feeds to limit switch 14 a command signal representative of a new predetermined load position, line A is grounded and either line B or line C is grounded, depending upon the direction of rotation of the motor required to move the load to the new predetermined load position. For the purpose of discussion, it is assumed that line B is grounded. Relay 46 closes to apply alternating current power to stator windings 34 and 36 and relay 52 closes to short circuit damping resistor 50. As a result, the motor rotatably drives the load in the direction determined by contact pair 42, which is toward the new predetermined load position. As the load approaches the new predetermined load position, three operations take place in sequence. First, line A becomes ungrounded to open switches 46 and 52. This removes electrical power from stator windings 34 and 36, so the motor coasts, and switches damping resistor 50 in series with phase shifting capacitor 48 to dissipate the charge thereon. As a result of damping resistor 50, oscillations in stator windings 36 and 38 are quickly suppressed. Such oscillations are undesirable because they introduce an element of unpredictability into the motor stopping process. Second, line C is grounded to close the other contact pair, i.e., contact pair 44, after substantially all the charge stored in capacitor 48 has been dissipated. As a result, stator windings 34 and 36 are both directly connected in parallel. Up to this point, capacitor 58 has been charging through resistor 54 and diode 56. Third, at a precisely selected position before the new predetermined load position, line D is grounded to connect capacitor 58 directly in parallel with stator windings 34 and 36. As a result, the charge stored on braking capacitor 58 discharges through stator windings 34 and 46, thereby braking the motor in a well-known manner. The load position at which line D is grounded is precisely selected so the load stops at the predetermined load position.

In summary, a plurality of motor decelerating means are sequentially actuated as the load, approaching the predetermined load position, passes certain milestone positions. First, power is disconnected from the stator windings of the motor and the damping resistor is connected in series with the phase shifting capacitor. The selection of this milestone position is not critical in that it does not have a substantial influence on the accuracy of the load stopping operation. Then, the braking capacitor is discharged into the stator windings with both direction determining contact pairs closed. The selection of this milestone position is critical in that it is the primary factor in determining the accuracy of the stopping operation. The considerations in selecting the position for opening relays 46 and 52 are that the motor should not be deenergized too early because that would slow the repositioning process, nor should it be deenergized too late because that would provide insufficient time for the braking operation. Briefly, relays 46 and 52 should be opened just early enough so that phase shifting capacitor 48 is discharged and both of the direction determining relays are closed when the braking operation begins.

Assume for the purposes of discussion that the induction motor is geared to drive the load at 60 inches per minute, which is equal to 1 millisecond per 0.001 inch, the load moves over a linear distance of 30 inches, the incremental encoder of the programmable limit switch indicates increments of 0.001 of an inch from a reference position of 0 up to 30 inches, and it is desired that the load be moved from a starting position of 10.000 inches to 16.000 inches. Typical limit values stored in the corresponding addressable memory are as follows: For relays 46 and 52, a lower limit of 0 and an upper limit of 15.920 inches so that the motor is energized as soon as one of the addressable memories is selected by position selector 10 and deenergized in sufficient time to permit the discharge of capacitor 48 before the braking operation; for the direction determining switch (42 or 44) required to move the load to the predetermined load position, a lower limit of 0 and an upper limit of 30 inches so this direction determining switch also closes when the corresponding addressable memory is selected by position selector 10 and is maintained in a closed condition until after the positioning operation is completed; for the other direction determining switch (42 or 44), a lower limit of 15.940 inches and an upper limit of 30 inches, so this switch closes before the braking operation and remains closed until after the positioning operation is completed; for relay 60, a lower limit of 15.980 inches and an upper limit of 30 inches, so the braking capacitor discharges into stator windings 34 and 36 from a precisely determined position before the predetermined load position, until after the positioning operation is completed. Typically, under the assumed conditions, an accuracy of the order of ±0.002 of an inch can be achieved by practicing the described invention.

To change the predetermined load positions at which the load is to be stopped or to refine and tune the control system to stop better and more accurately at predetermined load positions, new words can be substituted for those in the addressable memories by inputting such words through programmer 12. For example, if the milestone position selected for closing relay 60, to start the braking operation, does not provide sufficient accuracy, new limit values can be inputted through programmer 12 by a human operator to improve the accuracy by an iterative process of limit value selection.

FIG. 4 discloses in detail another embodiment of control circuit 16 and induction motor 18. Induction motor 18, which has stator windings 66, 68, and 70, and a rotor 71 connected to load 20, is a three-phase, delta connected motor. A source of three-phase, alternating current electrical power, e.g., 220 volts, 60 cycle, has output terminals 72, 74, and 76. A double throw, double pole, direction determining relay has a control winding 76, a movable contact 78 alternately making electrical contact with stationary contacts with 79 and 80, and a movable contact 82 alternately making electrical contact with stationary contacts 83 and 84. An AC solid state relay 86 is connected in series between output terminal 72 and movable contact 78. An AC solid state relay 88 is connected in series between output terminal 74 and movable contact 82. The junction of stator windings 68 and 70 is connected to stationary contacts 80 and 83. The junction of stator windings 66 and 68 is connected to stationary contacts 79 and 84. Output terminal 76 is directly connected to the junction of stator windings 66 and 70. A resistor 90, a diode 92, and a braking capacitor 94 are connected in series between movable contact 82 and the junction of stator windings 66 and 70. A DC solid state relay 96 is connected in parallel with the series combination of resistor 90 and diode 92. This embodiment controls three motor operations. Thus, programmable limit switch 14 has three outputs connected to control circuit 16. A line E is connected from one output switch of programmable limit switch 14 to relays 86 and 88. When the output switch to which line E is connected closes, line E is grounded. Direct current from a source of positive bias voltage 98 flows through switches 86 and 88, thereby closing them. A line F is connected from another output switch of programmable limit switch 14 through relay 96 to bias voltage source 98. When the output switch to which line F is connected closes, line F is grounded and current flows through relay 96, thereby closing it. A line G is connected from another output switch of programmable limit switch 14 through winding 76 to source 98. When winding 76 is not energized, movable contact 78 makes contact with stationary contact 79, movable contact 82 makes contact with stationary contact 83, and the motor rotates in one direction if energized. When the output switch to which line G is connected closes, line G is grounded, winding 76 is energized, movable contact 98 makes electrical contact with stationary contact 80, movable contact 82 makes contact with stationary contact 84, and the motor rotates in the other direction if energized.

When the motor is at one predetermined load position and position selector 10 feeds to limit switch 14 a command signal representative of a new predetermined load position, line E is grounded and line G is either grounded or ungrounded depending upon the direction of rotation of the motor required to move the load to the new predetermined load position. As the load approaches the new predetermined load position, only two operations take place in this embodiment. First, line E becomes ungrounded to open relays 86 and 88 so the motor begins to coast. Then, at a precisely selected position before the new predetermined load position, line F is grounded to connect capacitor 94 directly in parallel with stator winding 66 and the series combination of stator winding 68 and 70. As a result, the charge stored on braking capacitor 94 discharges through the stator windings, thereby braking the motor in the same manner as the embodiment of FIG. 3.

The DC relays referred to herein are unilateral or bilateral, electronic or electromechanical swithes that close immediately upon being grounded. The AC relays referred to herein are bilateral electronic or electromechanical switches that most conveniently close at a predetermined point of the alternating current cycle, e.g., at the zero voltage crossings, but that could also close immediately upon being grounded.

By way of example, AC relays 46, 52, 86, and 88 could be Crydom solid state relays, International Rectifier Part No. S440, S441, S442, or S443. By way of example, DC relays 60 and 96 could be Crydom solid state relays, International Rectifier Part Nos. S430 or S432.

The described embodiments of the invention are only considered to be preferred and illustrative of the inventive concept; the scope of the invention is not to be restricted to such embodiment. Various and numerous other arrangements may be devised by one skilled in the art with departing from the spirit and scope of this invention.

What is claimed is:
1. A positional control system comprising:
   a movable load to be positioned;
   means for sensing the position of the load;
   an induction motor coupled to the load to move the load as the motor operates, the induction motor having two or more stator windings;
   means for applying alternating current power to the stator windings to energize the motor;
   means for storing direct current electrical energy;
   means responsive to the position sensing means for disabling the applying means as the motor approaches a predetermined load position; and
   means responsive to the position sensing means for connecting the storing means, to the motor as the motor approaches more closely to the predetermined load position to apply direct current to the stator windings, and to stop the motor at the predetermined load position.

2. The system of claim 1, in which the induction motor has at least two input terminals to which the stator windings are connected, the applying means comprises an alternating current relay means connected in series with the input terminals of the induction motor, and the connecting means comprises a direct current relay connected from the source to one input terminal of the induction motor.

3. The system of claim 2, in which the storing means comprises a capacitor and a rectifier connected in series between the first and second input terminals of the motor and the direct current relay is connected from the junction of the capacitor and the rectifier to the one input terminal of the induction motor.

4. The system of claim 3, in which the induction motor has first and second input terminals, a first stator winding and a first direction determining switch connected in series across the input terminals, a second stator winding and a second direction determining switch connected in series across the input terminals, a phase shifting capacitor connected between the junction of the first winding and the first switch and the junction of the second winding and the second switch, and a rotor;
   relay means comprises an alternating current relay connected in series with the first and second input terminals;
   the system additionally comprising a damping resistor connected in series with the phase shifting capacitor between the junction of the first winding and the first direction determining switch and the junction of the second winding and the second direction determining switch and means for short circuiting the damping resistor while alternating current power is being applied to the stator windings.

5. The system of claim 4, additionally comprising means for opening one of the direction determining switches and closing the other direction determining switch while alternating current power is being applied to the stator windings.

6. The system of claim 5, additionally comprising means for closing the other direction determining switch after the applying means is disabled.

7. The system of claim 5, additionally comprising means for closing the other direction determining switch after the applying means is disabled and before the storing means is connected to the motor.

8. The system of claim 7, additionally comprising:
   means for generating a first digital signal representative of the actual position of the load;
   means for storing a plurality of second digital signals, each representative of a plurality of positions between an upper limit and a lower limit during which the motor is to be energized;
   means for storing a plurality of third digital signals, each representative of a plurality of positions between an upper limit and a lower limit during which the braking capacitor is to be discharged into the windings;

means for comparing the first signal with a selected one of the second signals and a selected one of the third signals corresponding to a predetermined load position;

the applying means comprising means responsive to the comparing means for closing the alternating current relay when the actual position represented by the first signal is between the upper and lower limits represented by the selected one of the second signals; and the connecting means comprises means responsive to the comparing means for closing the direct current relay when the actual position represented by the first signal is between the upper and lower limits represented by the selected one of the third signals.

9. The system of claim 8, in which the direction controlling means comprises:

means for storing a plurality of fourth digital signals, each representative of a plurality of positions between an upper limit and a lower limit during which the one direction determining switch is to be closed;

means for comparing the first signal with a selected one of the fourth signals corresponding to the predetermined load position; and means responsive to the comparing means for closing the one direction determining switch when the actual position represented by the first signal is between the upper and lower limits represented by the selected one of the fourth signals.

10. The system of claim 9, in which the direction controlling means additionally comprises:

means for storing a plurality of fifth digital signals, each representative of a plurality of positions between an upper limit and a lower limit during which the other direction determining switch is to be closed;

means for comparing the first signal with a selected one of the fifth signals corresponding to a predetermined load position; and means responsive to the comparing means for closing the other direction determining switch when the actual position represented by the first signal is between the upper and lower limits represented by the selected one of the second signals.

11. The system of claim 10, in which the short circuiting means comprises a short circuiting relay connected in parallel with the damping resistor and means responsive to the comparing means for closing the short circuiting relay when the actual position represented by the first signal is between the upper and lower limits represented by the selected one of the second signals.

12. The control system of claim 2, in which the motor is a three phase induction motor having a rotor, first, second, and third input terminals, first, second, and third stator windings in a delta connection forming first, second, and third nodes, the third node being permanently connected to the third input terminal, and direction control switching means for alternately connecting the first and second nodes to the first and second input terminals, respectively, and connecting the first and second nodes to the second and first input terminals, respectively, thereby controlling the rotor direction, and the relay means comprising a first alternating current relay connected in series between the first input terminal and the direction control switching means and a second alternating current relay connected in series between the second input terminal and the direction control switching means so as to connect three phase alternating current to the stator windings when the first and second alternating current relays are closed and to disconnect the motor when the first and second alternating current relays are open.

13. The system of claim 12, additionally comprising:

means for generating a first digital signal representative of the actual position of the load;

means for storing a plurality of second digital signals, each representative of a plurality of positions between an upper limit and a lower limit during which the motor is to be energized;

means for storing a plurality of third digital signals, each representative of a plurality of positions between an upper limit and a lower limit during which the braking capacitor is to be discharged into the windings;

means for comparing the first signal with a selected one of the second signals and a selected one of the third signals corresponding to a predetermined load position;

the applying means comprising means responsive to the comparing means for closing the first and second alternating current relays when the actual position represented by the first signal is between the upper and lower limits represented by the selected one of the second signals; and the connecting means comprises means responsive to the comparing means for closing the direct current relay when the actual position represented by the first signal is between the upper and lower limits represented by the selected one of the third signals.

14. A positional control system comprising:

a movable load to be positioned;

an induction motor having a plurality of stator windings and a rotor coupled to the load to move the load as the motor operates;

means for connecting an alternating current source to the windings to operate the motor; and means for stopping the load at a predetermined position including means for first disconnecting the alternating current source from the windings as the load, approaching the predetermined position, reaches a first distance therefrom and means for then applying direct current to the stator windings as the load reaches a second distance, from the predetermined position less than the first distance to brake the rotor.

15. An induction motor comprising:

first and second input terminals;

a first stator winding and a first direction determining switch connected in series across the input terminals;

a second stator winding and a second direction determining switch connected in series across the input terminals;

a phase shifting capacitor connected between the junction of the first winding and the first switch and the junction of the second winding and the second switch;

a rotor;

a third switch connected in series with the windings so the windings are disconnected from the input terminals when the third switch opens and are connected to the input terminals when the third switch closes;

a damping resistor connected in series with the phase shifting capacitor between the junction of the first winding and the first direction determining switch and the junction of the second winding and the second direction determining switch and a fourth switch connected in parallel with the damping resistor to short circuit the damping resistor when the fourth switch is closed; and means for opening the third and fourth switches and thereafter braking the rotor to stop the motor.

16. The motor of claim 15, in which the rotor is braked by:

a charging and discharging circuit having a rectifier and a braking capacitor connected in series;

a fifth switch connected in parallel with the rectifier; and means for connecting the charging and discharging circuit across the input terminals so the braking capacitor charges when the fifth switch opens and discharges into the stator windings when the fifth switch closes.

17. A three phase induction motor comprising:

a rotor;

first, second, and third input terminals;

first, second, and third stator windings in a delta connection forming first, second, and third nodes, the third node being permanently connected to the third input terminal;

direction control switching means for alternately connecting the first and second nodes to the first and second input terminals, respectively, and connecting the first and second nodes to the second and first input terminals, respectively, thereby controlling the rotor direction;

a first switch connected in series between the first input terminal and the direction control switching means;

a second input switch connected in series between the second input terminal and the direction control switching means so as to connect three phase alternating current to the stator windings when the first and second switches are closed and to disconnect the motor when the first and second switches are open;

a charging and discharging circuit having a rectifier and a braking capacitor in series;

a third switch in parallel with the rectifier; and means for connecting the charging and discharging circuit across the second and third input terminals so that braking capacitor charges when the third switch is open and discharges into the stator windings when the third switch is closed.

* * * * *